(12) United States Patent
Gyrling

(10) Patent No.: US 12,242,863 B2
(45) Date of Patent: *Mar. 4, 2025

(54) ACCELERATED APPLICATION START USING ESTIMATED PLAY DURATION

(71) Applicant: Sony Interactive Entertainment LLC, San Mateo, CA (US)

(72) Inventor: Christian Gyrling, Los Angeles, CA (US)

(73) Assignee: Sony Interactive Entertainment LLC

(*) Notice: Subject to any disclaimer, the term of this patent is extended or adjusted under 35 U.S.C. 154(b) by 0 days.

This patent is subject to a terminal disclaimer.

(21) Appl. No.: 18/235,463

(22) Filed: Aug. 18, 2023

(65) Prior Publication Data

US 2023/0409347 A1  Dec. 21, 2023

Related U.S. Application Data

(63) Continuation of application No. 16/854,230, filed on Apr. 21, 2020, now Pat. No. 11,734,020.

(60) Provisional application No. 62/845,210, filed on May 8, 2019.

(51) Int. Cl.
| | | |
|---|---|---|
| G06F 9/44 | (2018.01) | |
| G06F 8/61 | (2018.01) | |
| G06F 9/445 | (2018.01) | |
| G06N 3/04 | (2023.01) | |
| G06N 3/08 | (2023.01) | |

(52) U.S. Cl.
CPC ............ *G06F 9/44505* (2013.01); *G06F 8/61* (2013.01); *G06N 3/04* (2013.01); *G06N 3/08* (2013.01)

(58) Field of Classification Search
CPC .................................................. G06F 9/44505
USPC ........................................................ 718/100
See application file for complete search history.

(56) References Cited

U.S. PATENT DOCUMENTS

| | | | |
|---|---|---|---|
| 9,545,574 B2 * | 1/2017 | Justice | ............... A63F 13/355 |
| 9,643,093 B2 | 5/2017 | Zahn et al. | |
| 10,425,474 B2 * | 9/2019 | Lahr | ............... H04L 67/1091 |
| 11,413,550 B2 | 8/2022 | Watson et al. | |
| 2014/0156863 A1 | 6/2014 | Gao et al. | |

(Continued)

OTHER PUBLICATIONS

Final Office Action for U.S. Appl. No. 16/854,230, dated Nov. 22, 2022.

(Continued)

*Primary Examiner* — Evral E Bodden
(74) *Attorney, Agent, or Firm* — Kilpatrick Townsend & Stockton LLP

(57) ABSTRACT

A method for accelerating the start time of an application is described herein, comprising receiving application chunk information from a user, wherein playtime information is associated with the application chunk information, wherein the application chunk is a discrete portion of the application and the playtime information is an estimated time for one or more similar users to reach a chosen state or landmark in the application; predicting a download duration from the application chunk information and network information; comparing predicted download duration to stored playtime information associated with a previously received application chunk and the playtime information associated with the application chunk information; and installing the previously received application chunk when the predicted download duration is less than the stored playtime information.

20 Claims, 5 Drawing Sheets

(56) References Cited

U.S. PATENT DOCUMENTS

| | | | |
|---|---|---|---|
| 2017/0080337 A1* | 3/2017 | Pereira | H04L 47/365 |
| 2018/0060053 A1* | 3/2018 | Snider | G06F 8/61 |
| 2019/0090023 A1* | 3/2019 | Lee | H04N 21/8456 |
| 2019/0095786 A1* | 3/2019 | Carbune | G06Q 30/0202 |

OTHER PUBLICATIONS

International Search Report and Written Opinion dated Jul. 28, 2020 for International Patent Application Number PCT/US2020/029103.
Non-Final Office Action for U.S. Appl. No. 16/854,230, dated Jul. 12, 2022.
Notice of Allowance for U.S. Appl. No. 16/854,230, dated Mar. 22, 2023.
U.S. Appl. No. 62/845,210 to Christian Gyrling, filed May 8, 2019.

* cited by examiner

ACCELERATED APPLICATION START USING ESTIMATED PLAY DURATION

CLAIM OF PRIORITY

This application is a continuation of U.S. patent application Ser. No. 16/845,210 filed Apr. 21, 2020, the entire contents of which are incorporated herein by reference. U.S. patent application Ser. No. 16/845,210 claims the priority benefit of U.S. Provisional Patent Application No. 62/845,210, filed May 8, 2019, the entire contents of which are incorporated herein by reference.

FIELD OF THE INVENTION

Aspects of the present disclosure generally relate to downloading of application data specifically the present disclosure relates to accelerating the playability of an application during download.

BACKGROUND OF THE INVENTION

In the past, computer applications were distributed via physical media such a floppy discs or compact discs. More recently, application distribution has moved on-line. Unlike distribution through physical media, which allows applications to be used as soon as the files are installed, on-line distribution of application requires the application data to be downloaded before it can be installed and used. Downloading application data extends the time the between when the user purchases the application and when they can actually use the application. Depending on the user's network connection the time it takes to download the application data can be quite significant.

Thus, there is a need in the art, for a system that allows users to start using applications in an accelerated manner.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention. As used herein the terms estimated play duration and playtime may be used interchangeably and refer to the same concept. In general, these terms refer to an estimated amount of time from when a user begins using a portion of an application until the application will need to have another portion ready in order for the user to experience the application without interruption.

Figure 1:
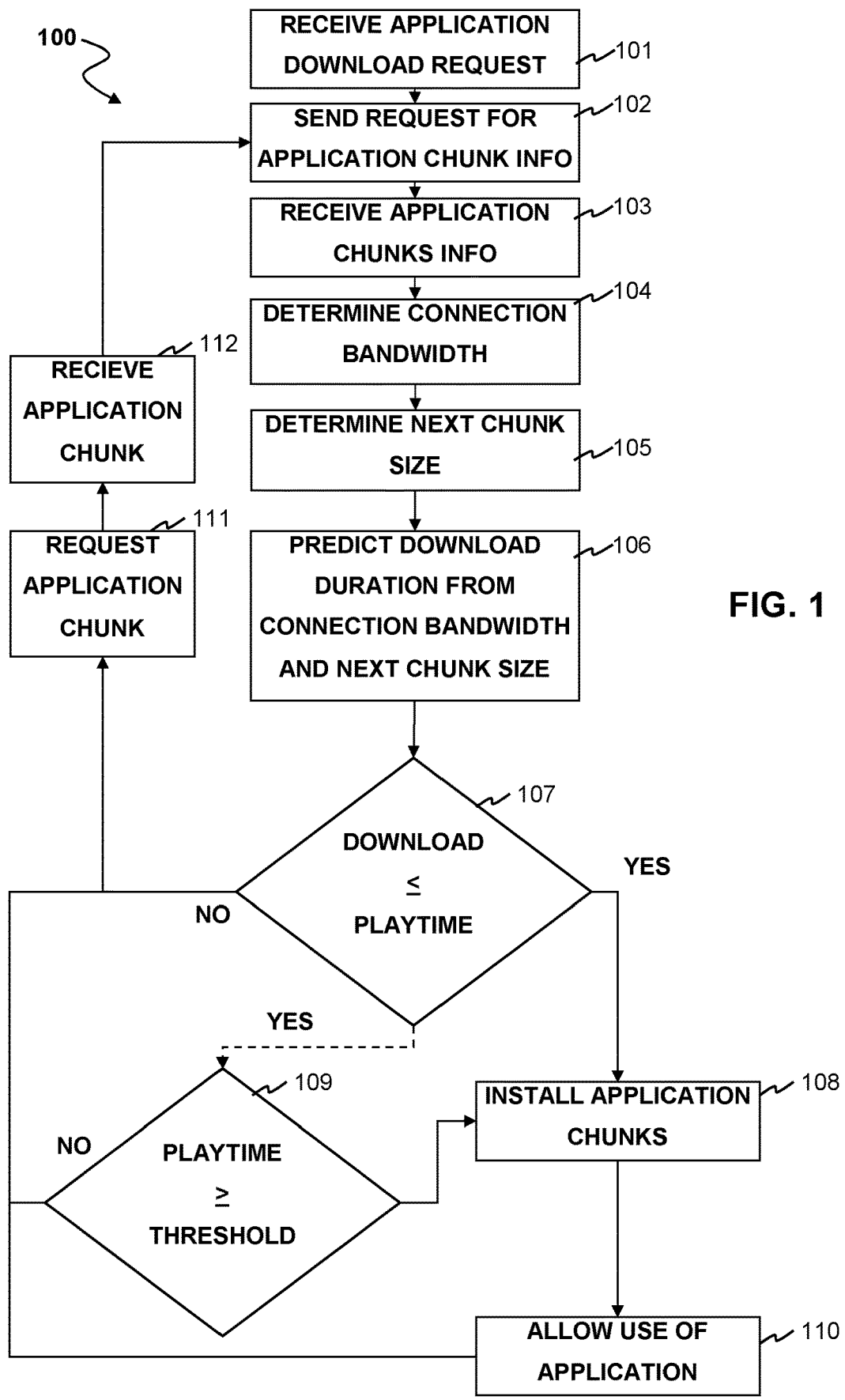
FIG. 1 is a block diagram of a method for accelerated game start according to aspects of the present disclosure.

FIG. 1 shows a method for accelerated game start using estimated play duration according to aspects of the present disclosure. Initially, a user may request to install an application at 101. The application may, for example and without limitation be; a video game, interactive movie, or the like. After a request to install the application is received from the user, the system may send a request for application chunk information to a server through a network at 102. The request may, for example and without limitation, be sent to a server, a content delivery network (CDN), a peer network, or similar system for delivering data over a network. The application chunk information is then received at 103 through the network and used to determine information about an, application chunk or application chunks that are to be downloaded.

The system may determine the bandwidth of the network as part of the accelerated game start method at 104. Alternatively, the bandwidth of the network may be determined at 104 as part of another process (for example and without limitation, an operating system) and the bandwidth information may be used as part of the accelerated game start method. The bandwidth information may be determined, for example and without limitation, by sending a ping, uploading a sample file and downloading a sample file to a server to determine network latency, upload speeds and download speeds. The connection bandwidth may be determined once at the start of the device, operating system, application etc. Alternatively, the connection bandwidth may be periodically determined at a set interval or at the start of each download request. Once connection bandwidth is determined, the size of the next application chunk may be determined at 105 from the application chunk information.

The application chunk size and the network bandwidth information may be used to determine the duration of the next download for the next application chunk at 106. For example and without limitation, the download duration for the next application chunk in a sequence of chunks may be determined with the following equation;

$$[\text{Bandwidth}]/[\text{Chunk Size}] \qquad \text{EQ. 1}$$

The network bandwidth [Bandwidth] and [Chunk Size] may be expressed in units of different magnitude. Thus to determine download duration conversion to the proper units may be necessary. After the download duration has been determined for the next application chunk, the system compares the download duration to the application information for application chunks currently stored by the system. Specifically the download duration may be compared to the playtime information associated with application chunks stored in memory or in some other storage medium as indicated at 107. In some implementations the system may simply compare the playtime [playtime] with the download duration [download];

$$[\text{play time}] > [\text{download}] \qquad \text{Eq. 2}$$

If the playtime associated with the stored application chunks is greater than the download duration of the next application then the system may install the application chunks stored in memory at 108. If the playtime associated with the stored application chunks is not greater than the download duration, the system may request to download the next application chunk in a download list not stored in memory at 111 and subsequently may receive the application chunk and store the application chunk at 112 either in memory, in mass storage, or some other storage medium. Additionally, according to aspects of the present disclosure, the system may install the application when the playtime for the stored application chunks is equal to or greater than the download and install duration of the next application chunk. In some implementations according to aspects of the present disclosure, application chunks in a download list may be in groups or sets by the same or different priorities. Chunks with the same priority (e.g., index in the case of a list) would be downloaded at the same time. Multiple chunks (even with different priorities) may begin downloading at the same time if for example and without limitation downloading only a single chunk would not maximize the download bandwidth. In this case, the user might experience a faster overall download time if multiple chunks were downloaded in parallel.

After the installation process for the stored application chunks is completed, the system may allow the user to access and use the application at 110. While the user is accessing the application, the system may begin downloading the next application chunk. The system begins downloading the next application chunk by sending a request to a server for the next chunk at 111. After the server receives the request, the next application chunk is sent to, and subsequently received by the system at 112.

After receiving the chunk, the system may continue the process, requesting chunk information for the next chunk to be downloaded at 102. The system may then carry out the rest of the above-described steps until all of the application chunks that make up the entirety of the application are downloaded and installed.

Additionally, in some embodiments, the system may also use the playtime associated with stored chunks to determine whether to install the stored application chunks. In some implementations, the system may compare the playtime associated with stored application chunks to a stored playtime threshold as indicated at 109. If the playtime associated with the stored application chunks meets the stored playtime threshold then the system will install the application chunks at 108. If the playtime associated with the stored application chunks is insufficient with respect to the stored playtime threshold more application chunks will be requested at 111 and downloaded at 112.

In some implementations, the system may look ahead to a plurality of chunks that have not been downloaded and use the download duration of the plurality of application chunks. The download duration of the plurality of chunks that have not been downloaded may be determined for example and without limitation by simply adding the download duration for each of the application chunks. Alternatively, the download duration may be determined by adding together the chunk sizes of the plurality of application chunks in the application that have not been downloaded and inserting the addition into EQ. 1. The plurality of application chunks that have not been downloaded may include two or more of the next application chunks in a download list. In some instances when the next application chunk to be downloaded is insufficient to meet a threshold, the system may look to the next application chunk in the download list to determine whether or not to install the application chunks already stored in memory.

Figure 2:
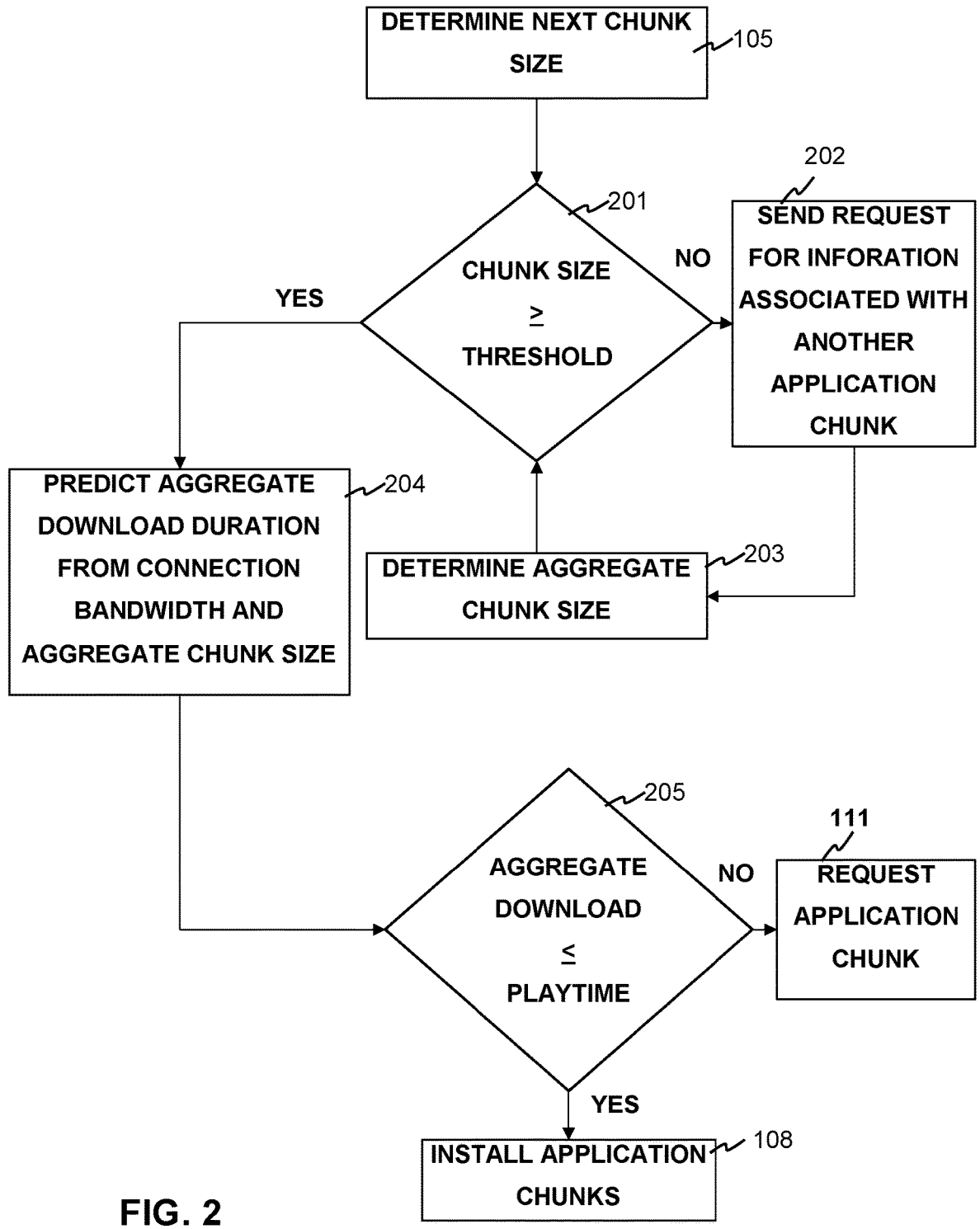
FIG. 2 is a block diagram of a method for accelerated game start using aggregated application chunk size according to an aspect of the present disclosure.

In other embodiments, the system may look ahead several application chunks based on application chunk size to determine whether to install the stored application chunks as shown in FIG. 2. To implement this feature the system by way of example and not by way of limitation may compare the application chunk size to a chunk size threshold as indicated at 201. If the size of the application chunk to be downloaded does not meet the chunk size threshold (e.g., it is below the threshold) the system may use an additional application chunk to be downloaded to calculate download duration. The system may send a request for information about an additional application chunk to the server at 202 or alternatively, the system may simply determine the additional application chunk information from data already received (e.g. a table in memory). The additional application chunk size may be determined from the additional application chunk information and aggregated with the next chunk size at 203 (for example and without limitation the two may be added together). The aggregate chunk size is again compared to the chunk size threshold at 201 and if the aggregate chunk size does not meet the threshold, the process repeats, as indicated at 202. If the aggregate chunk size or the next chunk size meets or exceeds the chunk size threshold the down duration is predicted from the connection information and the aggregate chunk size at 203 or from the next chunk size as in 106. In the case of an aggregate chunk size, the aggregate download duration is compared to the playtime associated with application chunks stored in memory as indicated at 205. If the playtime of the stored application chunks is less than the download duration then the next application chunk may be requested at 111 and downloaded and the process starts over as shown in FIG. 1. If the aggregate download duration is less than the playtime of the stored chunks the application chunks are installed at 108 and the process continues as shown in FIG. 1. In some embodiments, the system may determine the download duration of each chunk to be downloaded from the application chunk size and connection information. The download duration may be compared to a download duration threshold and if the download duration does not meet the download duration threshold the system may request information for additional application chunks similar to 303. In yet other embodiments each additional application chunk may be compared to a separate threshold to determine whether more application chunks should be used in determination of download duration or for the comparison of EQ 2.

Figure 3:
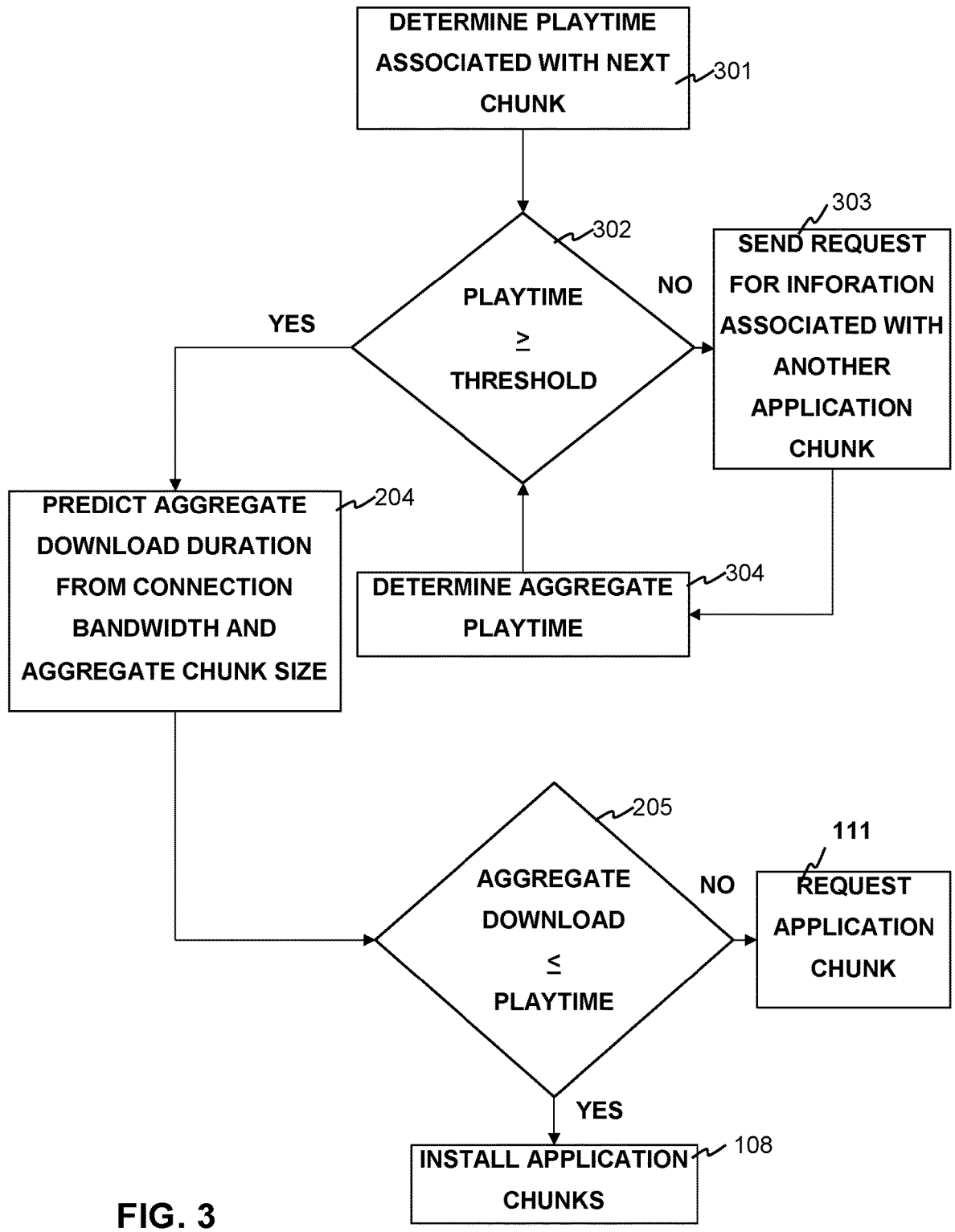
FIG. 3 is a block diagram of a method for accelerated game start using aggregated playtime associated with application chunks according to an aspect of the present disclosure.

According to aspects of the present disclosure, the system may use download duration and the playtime information associated with application chunks that have not been downloaded to closely match the system bandwidth to playtimes as shown in FIG. 3. For example and without limitation the system may use the playtime associated with stored application chunks and the playtime of the next application chunk in a download list when determining whether to install and allow the user to use the application. The system may compare the playtime associated with a next application chunk to be downloaded as indicated at 302. If the playtime time is less than a playtime threshold, the system may request application chunk information (including an associated playtime) for an additional application chunk to be downloaded at 303. The playtime of the additional application chunk and the next application chunk may then be aggregated (e.g. added) at 304. The aggregated playtimes associated with the application chunks may then be compared to the playtime threshold at 302. The aggregate download duration is then predicted at 204 and the process continues, as shown in FIG. 2 if the aggregate playtime exceeds the playtime threshold. Otherwise the process repeats back to receive information for an additional chunk at 303. Any number of additional application chunks of in a download list may be compared this way to meet playtime threshold for application chunks to be downloaded.

In some implementations, the system may ignore certain application chunks during calculation of EQ 2 based on their associated playtime information. According to aspects of the present disclosure certain types of application chunks may be associated with 0 or null playtimes. For example and without limitation application chunks that contain menus or skippable cut scenes may be attributed with a 0 or null playtime length. When determining playtime length for application chunks stored in memory these 0 or null playtime length application chunks may be ignored.

The application chunk information may include by way of example and not by way of limitation, application chunk size, number of application chinks in the application, application chunk order, application chunk integrity information, etc.

According to aspects of the present disclosure, the application chunk information is also associated with playtime information. Playtime information may be associated with the application chunk information through a table provided to the system with the application chunk information. Alternatively, each application chunk may have meta-information that describes the playtime information. In other embodiments, the playtime information is an entry contained within application chunk information. The Application chunk information may be requested and downloaded individually for each application chunk or the application information for every application chunk that comprises an application may be downloaded at once and each subsequent request may be a query to a database or table having the application chunk information.

Playtime Information Association

Figure 4:
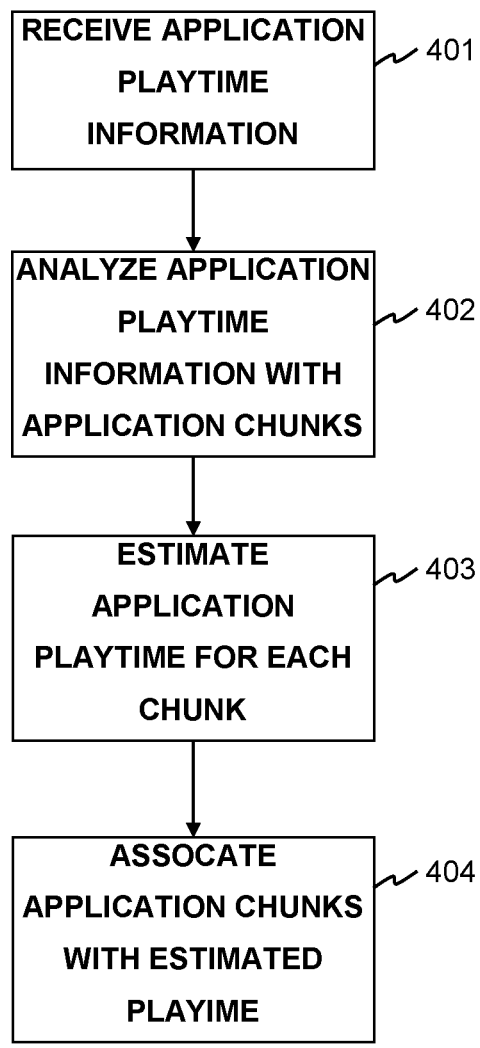
FIG. 4 is a block diagram depicting the method for associating playtimes to application chunks according to aspects of the present disclosure.

According to aspects of the present disclosure application chunks are associated with playtime information as shown in FIG. 4. The system may receive playtime information from a playtime information generator as indicated at 401. Alternatively, the system may generate playtime information from user inputs. The playtime information may for example and without limitation, be generated from actual playtimes recorded by application testers. Alternatively, the playtimes may be an average playtime determined from the recorded playtimes of many users, to support this function there may be a database where user playtimes are recorded or uploaded.

The application may also be analyzed to determine, by way of example and without limitation, how may application chunks make up the application, application size, the application chunk size, cut scene locations, menu locations, branching game pathways and other information about the application relevant to download time acceleration at 402. Additionally, the playtime information may be analyzed in conjunction with the application at 402 to determine for example and without limitation the relationship between the branching game pathways and the playtime, cut scene locations within the playtime, playtime length and other application settings, playtime variation, and playtime average.

After the application and playtime has been analyzed, the system may estimate the playtime for each application chunk at 403. In some embodiments, the application chunk size is determined before determining playtime information and markers for each application chunk are recorded with the playtime information. In such a case, playtime information for each chunk is simply estimated using the markers included with the playtime information. In other embodiments playtime information is recorded using entries for landmarks within the application, from these landmarks the playtime duration for each application chunk can be estimated. In yet other implementations, the playtime estimation and/or markers may be dependent on certain choices made by the player of the game. The choices may change the playtime estimate of the chunks. For example, and without limitation some games have skill trees that change the gameplay style and map usage based on the skill choices made by the player. A skill choice may be represented as data in save game information that then can be used in determining the playtime estimate to be used. In a simple example a game could have three classes to choose from, Thief, Fighter, Defender, these classes represent fundamental skill choices. A chunk could have different playtime depending on what skills the player had chosen. If the player is a thief, he/she might sneak past all guards and play through the section in 20 minutes, while a defender would take 40 minutes because it would be a slower progression through combat setups. This means that there could be conditions for a particular chunk.

Each playtime is then associated with each respective application chunk at 404. The association between playtimes and their respective application chunks may be accomplished using a table having entries identifying application chunks and playtimes. Alternatively, the playtimes may be entered as metadata in the application. In another alternative embodiment, the association may simply be through data file that contains the playtime and identifies the corresponding application chunk.

The playtime information may, for example and without limitation, correspond to the amount of time it takes for a user to reach an end state for the application. This may be determined, e.g., from application testing. For example, in some implementations, the estimated time for a user to reach the end state of the application may be determined from aggregated user data received from a plurality of users. Alternatively, the playtime information may be the amount of time it takes for a user to reach a chosen state or landmark within the application. For example and without limitation it the playtime may be the amount of time it takes for a player to complete a level of a video game or the amount of time it takes for a player to reach a cut-scene. A landmark within an application may be a specific developer application state, for example map change within a videogame, or a specific point within a level of a videogame, or achievement of a specific goal within a videogame. While the playtime information is described in relation to video games aspects of this disclosure are not so limited. Aspects of the present disclosure may be applied to any number of different types of application to accelerate application use time. For example and without limitation aspects of the present disclosure may be applied to education applications such as those for language learning, where the playtime is the time to complete a lesson. In learning applications playtime may also be estimated base on gameplay choices. For example, and without limitation, some learning applications have bonus points for extra quizzes and such. People that engage with those extra features would take longer to play and could have the content prioritized in a similar way. If a player engages with the bonus points the system may determine those game play choices and choose an alternative playtime estimation.

Figure 5:
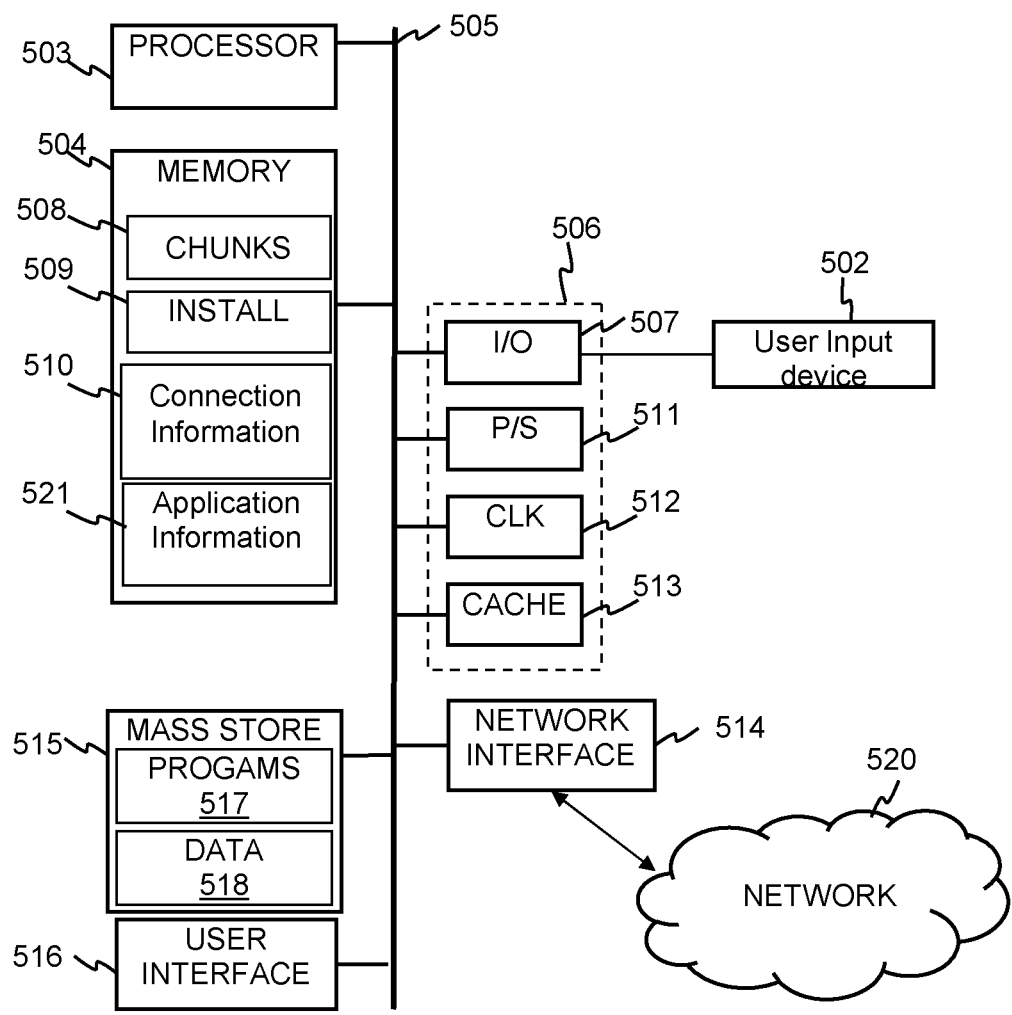
FIG. 5 is a schematic diagram of a system implementing the method for accelerated game start using estimated play duration according to aspects of the present disclosure.

In some embodiments of the present disclosure, multiple playtimes may be associated with each application chunk. The multiple playtimes may represent different usage styles associated with the application chunk. For example and without limitation the playtimes may be a conservative playtime, an average playtime, and a speed run playtime. In some embodiments a player's gameplay choices greatly affects the time estimate. For example, and without limitation, games may use points progression instead of time. A player can invest time in multiple skill paths and can therefore spend much more/less time in a chunk than initially anticipated. The system may choose between the different playtimes associated with the application chunk based on a selection made by the user for playstyles. Alternatively, the system may choose a playtime based on a player metric such as average time to complete an application. In some embodiments the system may default to the lowest playtime (e.g., a speedrun time) when determining whether to install and allow the of stored application chunks. System FIG. 5 depicts the system 500 configured to accelerate game start time using estimated play duration according to aspects of the present disclosure. The system 500 may include one or more processor units 503, which may be configured according to well-known architectures, such as, e.g., single-core, dual-core, quad-core, multi-core, processor-coprocessor, cell processor, and the like. The market place server may also include one or more memory units 504 (e.g., random access memory (RAM), dynamic random access memory (DRAM), read-only memory (ROM), and the like).

The processor unit 503 may execute one or more programs 517, portions of which may be stored in the memory 504 and the processor 503 may be operatively coupled to the memory, e.g., by accessing the memory via a data bus 505. The programs 517 may be configured to download application chunks 508 according to the method 100 described above with respect to FIG. 1 and/or FIG. 2 and/or FIG. 3. Additionally, the Memory 504 may contain information about connections 510 between the system and one or more servers or networks. Such connection information may include, e.g., internet protocol (IP) addresses, network address translator (NAT) traversal information, and connection performance information, such as bandwidth and latency. In addition, the Memory 504 may contain application information 521 such as information about the size of application chunks, number of application chunks that make up the application, order of application chunks, play time associated with the application chunks. The Memory 504 may also contain data corresponding installation information for the application 509. Alternatively, the installation information may be included in application data 508 or in a separate database (not shown). The installation information, application chunks, application information and connection information may also be stored as data 518 in the Mass Store 518.

The system 500 may also include well-known support circuits, such as input/output (I/O) 507, circuits, power supplies (P/S) 511, a clock (CLK) 512, and cache 513, which may communicate with other components of the system, e.g., via the bus 505. The computing device may include a network interface 514. The processor unit 503 and network interface 514 may be configured to implement a local area network (LAN) or personal area network (PAN), via a suitable network protocol, e.g., Bluetooth, for a PAN. The computing device may optionally include a mass storage device 515 such as a disk drive, CD-ROM drive, tape drive, flash memory, or the like, and the mass storage device may store programs and/or data. The marketplace server may also include a user interface 516 to facilitate interaction between the system and a user. The user interface may include a monitor, Television screen, speakers, headphones or other devices that communicate information to the user. A user input device 502 such as a mouse, keyboard, game controller, joystick, etc. may communicate with an I/O interface and provide control of the system to a user.

Aspects of the present disclosure allow for fast start of applications before all portions of the application have been downloaded or installed. By taking into account the time it takes for a user to interact with a portion of an application the user's interaction may begin before all portions of the application are available.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for accelerating a start time of an application, comprising:
    a) receiving application chunk information from a user, wherein playtime information is associated with the application chunk information, wherein the application chunk is a discrete portion of the application and the playtime information is an estimated time for one or more similar users to reach a chosen state or landmark in the application;
    b) predicting a download duration from the application chunk information and network information;
    c) comparing predicted download duration to stored playtime information associated with a previously received application chunk and the playtime information associated with the application chunk information; and
    d) installing the previously received application chunk when the predicted download duration is less than the stored playtime information.

2. The method of claim 1 wherein c) further comprises comparing the stored application playtime information associated with the previously received application chunk to a threshold and d) further comprises installing the application chunk when the stored playtime information at least meets the threshold.

3. The method of claim 1 further comprising granting the user access to the installed application chunk wherein the installed application chunk is a usable portion of a requested application.

4. The method of claim 3 further comprising receiving a requested application chunk and installing the requested application chunk.

5. The method of claim 1 wherein the playtime information is associated with the application chunk information as an entry in a table.

6. The method of claim 1 wherein the playtime information is meta information in the application chunk information.

7. The method of claim 1 wherein the application chunk information includes information about a next application chunk in a download sequence.

8. The method of claim 1 wherein the application chunk information include information about a plurality of application chunks in a download sequence and the playtime information includes a plurality of playtimes wherein each playtimes in the plurality of playtimes is associated with an application chunk in the plurality of application chunks.

9. The method of claim 8 wherein predicting the download duration includes predicting a download duration for at least two un-received application chunks in the download sequence.

10. The method of claim 9 wherein the download duration in c) is the download duration for at least two un-received application chunks in the download sequence and the playtime information includes playtime information associated with the at least two un-received application chunks.

11. The method of claim 1, wherein the estimated time for one or more similar users to reach the chosen state or landmark in the application is based at least on a usage style of the similar users.

12. The method of claim 1, wherein the application chunk is a discrete portion of the application having a beginning state and an end state and the playtime information is an estimated time for one or more similar users to reach the end state of the application chunk from the beginning state.

13. The method of claim 12 wherein the estimated time for a user to reach the chosen state or landmark in the application is determined from application testing.

14. The method of claim 12 wherein the estimated time for a user to reach the end state of the application is determined from aggregated user data received from a plurality of users.

15. The method of claim 12 wherein there is one beginning state and a plurality of end states.

16. The method of claim 12 wherein the application chunk is a video sequence and the playtime information is given a lowest possible weight.

17. The method of claim 12 wherein the application chunk is a menu and the playtime information is given a lowest possible weight.

18. The method of claim 1 wherein the predicted download duration is generated by a Neural Network trained with a machine learning algorithm to predict download duration using network information.

19. A system comprising:
a processor;
memory coupled to the processor;
non-transitory instructions embedded in the memory that when executed by the processor cause the processor to carry out a method comprising;
 a) receiving application chunk information from a user, wherein playtime information is associated with the application chunk information and the playtime information is an estimated time for one or more similar users to reach a chosen end state or landmark in the application;
 b) predicting a download duration from the application chunk information and network information;
 c) comparing the predicted download duration to stored playtime information associated with a previously received application chunk and the playtime information associated with the application chunk information; and
 d) installing the previously received application chunk when the predicted download duration is less than the stored playtime information.

20. Non-transitory instructions embedded in a computer readable medium that when executed cause a computer to carry out a method comprising;
 a) receiving application chunk information from a user, wherein playtime information is associated with the application chunk information, wherein the playtime information is an estimated time for one or more similar users to reach a chosen end state or landmark in the application;
 b) predicting a download duration from the application chunk information and network information wherein the application chunk is a discrete portion of the application and the playtime information is an estimated time for one or more similar users to reach a chosen state or landmark in the application chunk;
 c) comparing the predicted download duration to the stored playtime information and the playtime information associated with a previously received application chunk; and
 d) installing the previously received application chunk when the predicted download duration is less than the stored playtime information.

* * * * *